United States Patent [19]

Shekleton et al.

[11] Patent Number: 5,307,636

[45] Date of Patent: May 3, 1994

[54] STAGED, COAXIAL, MULTIPLE POINT FUEL INJECTION IN A HOT GAS GENERATOR HAVING A SUFFICIENTLY WIDE CONE ANGLE

[75] Inventors: Jack R. Shekleton, San Diego; Robert W. Smith, Lakeside, both of Calif.

[73] Assignee: Sundstrand Corporation, Rockford, Ill.

[21] Appl. No.: 820,033

[22] Filed: Jan. 10, 1992

Related U.S. Application Data

[63] Continuation of Ser. No. 470,081, Jan. 25, 1990, abandoned, which is a continuation-in-part of Ser. No. 272,409, Nov. 17, 1988, Pat. No. 4,974,415, which is a continuation-in-part of Ser. No. 123,303, Nov. 20, 1987, Pat. No. 4,899,538.

[51] Int. Cl.$^5$ ................................. F02G 1/00
[52] U.S. Cl. ............................... 60/742; 60/760
[58] Field of Search ............... 60/732, 733, 737, 742, 60/748, 759, 760, 39.465; 431/158, 182, 183, 185, 187, 242, 243

[56] References Cited

U.S. PATENT DOCUMENTS

| | | |
|---|---|---|
| 1,828,784 | 10/1931 | Perrin . |
| 3,910,494 | 10/1975 | Melton, Jr. ........................ 431/158 |
| 3,990,854 | 11/1976 | Dahmen ............................ 431/158 |
| 4,260,367 | 4/1981 | Markowski et al. ................ 60/748 |
| 4,343,605 | 8/1982 | Browning .......................... 431/158 |
| 4,389,848 | 6/1983 | Markowski et al. ................ 60/750 |
| 4,507,075 | 3/1985 | Buss et al. ......................... 60/760 |
| 4,974,415 | 12/1990 | Shekleton et al. ................. 60/760 |

Primary Examiner—Richard A. Bertsch
Assistant Examiner—T. Thorpe
Attorney, Agent, or Firm—Wood, Phillips, VanSanten, Hoffman & Ertel

[57] ABSTRACT

A hot gas generator includes a dual fuel injector (42) having spaced fuel discharge nozzles (48, 60) on the longitudinal axis (28) of a vessel (18) having a narrow inlet (22), an opposite narrow outlet (14) and an intermediate, enlarged chamber (24) which serves as a combustion chamber. The nozzle (60) injects a spray cone (64) of fuel in a cone angle that is sufficiently wide that a large angle exists between the fuel spray and the path (54) of high velocity combustion gases moving toward the outlet (14) to achieve excellent vaporization of fuel at fuel rich conditions without causing carbon buildup and/or the generation of black smoke in the exhaust.

11 Claims, 2 Drawing Sheets

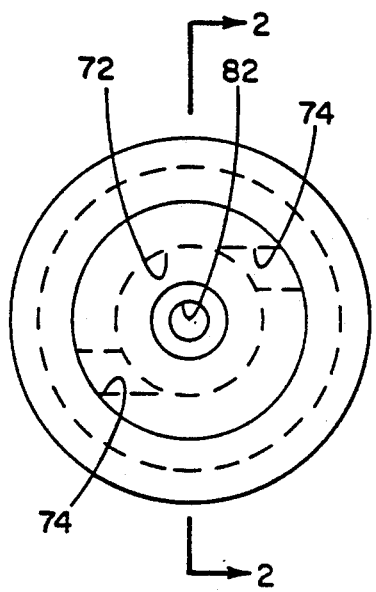
FIGURE 3
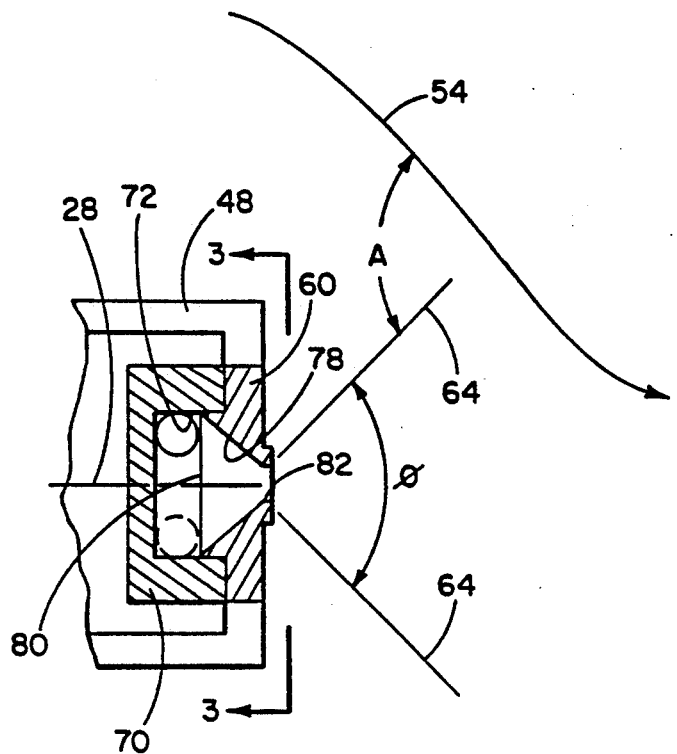
FIGURE 2
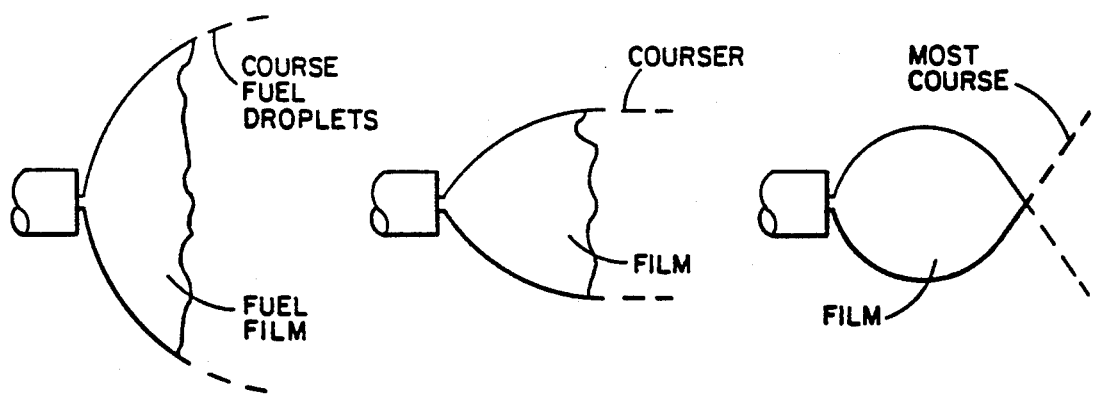
FIGURE 4
FIGURE 5
FIGURE 6

STAGED, COAXIAL, MULTIPLE POINT FUEL INJECTION IN A HOT GAS GENERATOR HAVING A SUFFICIENTLY WIDE CONE ANGLE

CROSS REFERENCE

This application is a continuation of application Ser. No. 470,081, filed Jan. 25, 1990 now abandoned which is a continuation-in-part of the commonly assigned application of Jack R. Shekleton, et al., application Ser. No. 272,409 filed Nov. 17, 1988, now U.S. Pat. No. 4,974,415 which in turn is a continuation in-part of the commonly assigned application of Jack R. Shekleton, application Ser. No. 123,303, filed Nov. 20, 1987 now U.S. Pat. No. 4,899,538, the details of both of which are herein incorporated by reference.

FIELD OF THE INVENTION

This invention relates to a generator for producing hot gasses as, for example, might be employed to drive a turbine wheel.

BACKGROUND OF THE INVENTION

Hot gas generators have long been utilized for producing hot gas under pressure to operate engines of various sorts as well as for other purposes. See, for example, U.S. Pat. No. 1,828,784 issued Oct. 27, 1931 to Perrin.

In such hot gas generators, a carbonaceous fuel is combusted with an oxidant to produce hot gasses of combustion. In addition, additional fuel may be introduced into the hot gasses of combustion to be vaporized, or partly decomposed, or both, dependent on gas temperature as opposed to combusted, to increase the volume of hot gas while bringing the temperature of the combustion gas down to some desired temperature incapable of causing damage to the system in which the generator is used.

One difficulty in the operation and use of such hot gas generators is carbon buildup. Carbon buildup results when the fuel is not completely oxidized and elemental carbon is formed within the combustion chamber of the generator. It may deposit itself at various locations therein, particularly those running at relatively cool temperatures. While carbon buildup can be avoided by providing the generator with an excess of oxidant, this results in excessive consumption of oxidant. As ordinarily there is a plentiful supply of liquid fuel, then in consequence, it is conventional practice to run a hot gas generator on the rich side so that all oxidant available for combustion is consumed to minimize the consumption of oxidant; and this raises the potential for carbon buildup.

As pointed out by Perrin in his previously identified United States Letters Patent, it is also desirable to cool the combustion chamber to prevent damage thereto by excessive heat from combustion occurring therein. Advantageously, this is accomplished by cooling the combustion chamber with fuel. However, in the Perrin construction, there is the opportunity for excessive cooling of the combustion chamber walls; and the resulting cool spots facilitate carbon buildup when the generator is operated on the rich side as is desired to prevent the existence of hot spots.

Carbon buildup is undesirable because it may interfere with heat transfer. However, another problem resulting from carbon buildup is much more serious. Specifically, such hot gas generators are frequently used to produce hot gasses for driving turbine wheels. As carbon builds up, particles of the same typically break free and then flow with the hot gas through the turbine wheel. Such particulate carbon erodes the turbine nozzles and the turbine wheels. Furthermore, carbon deposits can build up on the surfaces of the turbine nozzles and restrict the flow to cause performance losses.

The hot gas generators disclosed by Shekleton and Shekleton, et al. avoid many of these difficulties and accordingly are highly advantageous. Nonetheless, improvements in terms of simplifying the construction, assuring full and complete vaporization of fuel introduced downstream of the main combustion zone, and minimizing the number of obstructions in the gas flow zone are desirable.

The present invention is directed to providing the above improvements.

SUMMARY OF THE INVENTION

It is the principal object of the invention to provide a new and improved hot gas generator. More specifically, it is an object of the invention to provide a hot gas generator that is constructed with a simplified fuel injection nozzle structure. It is also an object of the invention to provide a hot gas generator with provision for enhanced vaporization of fuel injected into the hot gas generator downstream of the primary combustion zone.

An exemplary embodiment of the invention achieves the first of the above-named objects in a hot gas generator including a vessel with an interior wall having a narrow inlet and an opposite, narrow outlet end. An intermediate, relatively wide, combustion chamber connects the inlet and the outlet and an oxidant inlet port is disposed at the inlet end.

According to one facet of the invention, a dual fuel injector is disposed generally centrally within the oxidant port and extends a major way across the chamber generally centrally thereof. The fuel injector has first fuel discharge port at the inlet for directing fuel toward the combustion chamber and at least a second fuel discharge port near the outlet end for directing fuel toward the outlet end.

As a consequence, a unitary injection structure that may be readily serviced is defined and by reason of its central location within the chamber, the same does not impede gas flow.

In a highly preferred embodiment, this facet of the invention contemplates that the vessel have a longitudinal axis extending through the chamber between the ends and the injector is disposed substantially on the axis. The oxidant port is concentric with the axis and located about the fuel injector.

Preferably, the injector comprises first and second concentric conduits or tubes terminating in respective ones of the fuel discharge ports.

According to another aspect of the invention, there is provided a vessel having an oxidant inlet port as before. According to this facet of the invention, there is provided a first fuel injection port adjacent the inlet and a second fuel injection port within the chamber and upstream of the outlet end. The first fuel injection port is operable to inject fuel for combustion within the intermediate, relatively wide combustion chamber, and with the swirling oxidant, creates a central recirculating zone of combustion gases. Additionally, there is created an outer, high velocity flow of combustion gases which extends to the narrow outlet end; and this flow of gases is likewise created as a result of fuel injected through the first fuel injection port being oxidized within the combustion chamber. The second fuel injection port is located upstream of the outlet end as mentioned previously and is further, downstream of the central recirculating zone. It is operative to inject fuel across the outer, high velocity flow of combustion gases at a substantial angle and in the vicinity of the outlet end.

As a consequence, the evaporation of fuel from the second fuel injection port is so rapid that carbon buildup is avoided.

In a preferred embodiment, the vessel has a longitudinal axis on which the inlet and outlet ends as well as both fuel injection ports are located. The second port is operable to create a cone-like spray of fuel centered on the axis.

In a highly preferred embodiment, the spray of fuel has a cone angle on the order of 90 degrees.

In one embodiment of the invention, the second port includes a housing having a circular opening located on the longitudinal axis of the vessel, an interior, frusto-conical chamber section having its minor base at the opening, and an interior, cylindrical chamber section extending oppositely of the opening from the major base of the frusto-conical chamber section. At least one, and preferably two or more diametrically opposed, tangential fuel entry ducts open tangentially to the cylindrical chamber section.

Other objects and advantages will become apparent from the following specification taken in connection with the accompanying drawing.

DESCRIPTION OF THE DRAWING

FIG. 2 is an enlarged fragmentary sectional view of a fuel injector utilized with the invention;

FIG. 3 is an end view of the fuel injector;

FIG. 4 is a somewhat schematic illustration of the fuel film pattern at a relatively low pressure;

FIG. 5 is a view similar to FIG. 4 but showing the film pattern at an even lesser fuel pressure; and FIG. 6 is a view similar to FIGS. 4 and 5 but showing the film pattern at an extremely low pressure.

DESCRIPTION OF THE PREFERRED EMBODIMENT

Figure 1:
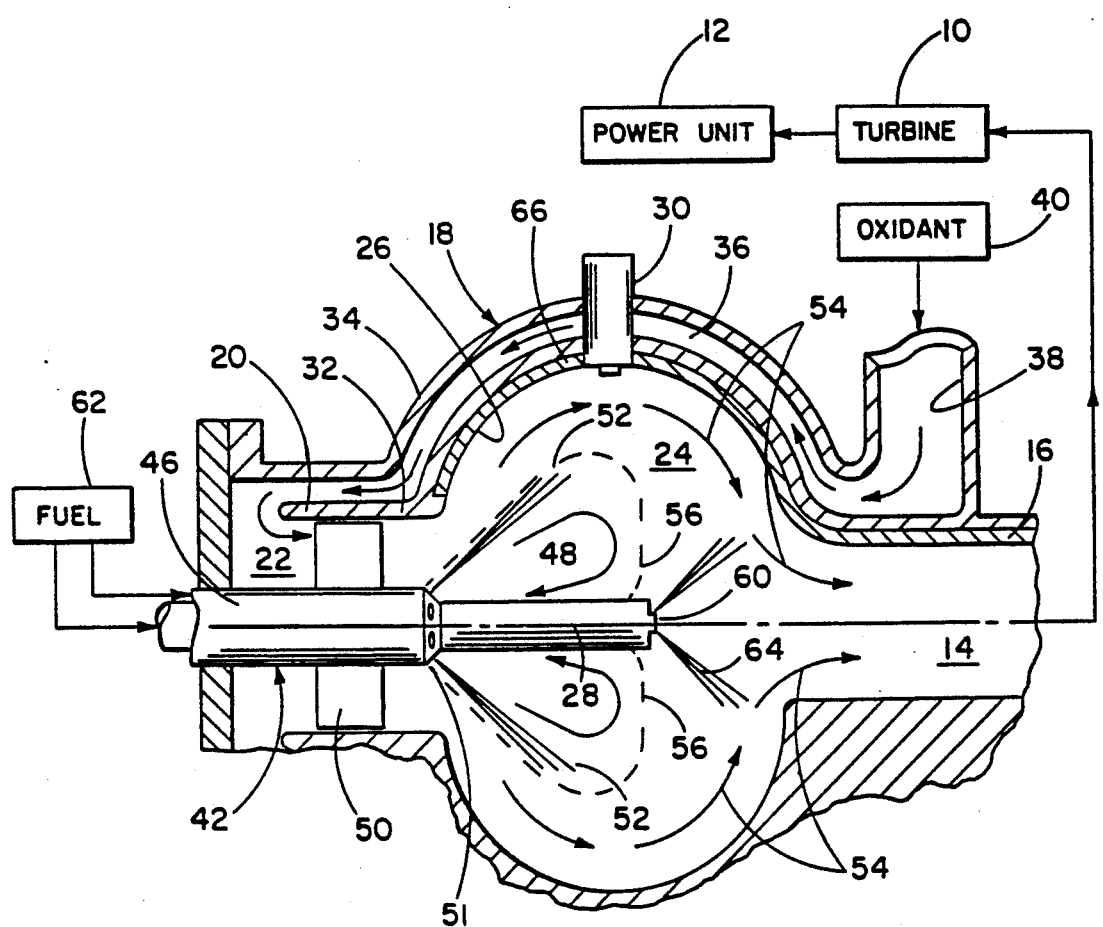
FIG. 1 is a partial schematic, partial sectional view of a hot gas generator made according to the invention along with certain components of a system with which the generator may be used.

An exemplary embodiment of a hot gas generator made according to the invention is illustrated in FIG. 1 in the environment of a turbine system including a turbine 10 for driving a power unit 12 such as a typical "emergency power unit" which may be in the form of an electrical generator, a hydraulic pump, a combination thereof, etc. The turbine 10 is driven with hot gas from an outlet 14 located at one end 16 of a vessel, generally designated 18. The opposite end 20 of the vessel 18 has an inlet 22 which is spaced from the outlet 14 by an intermediate, enlarged, combustion chamber 24. That is to say, the enlarged, intermediate combustion chamber 24 interconnects the narrow inlet 22 and the narrow outlet 14. Stated another way, the vessel 18 includes an interior surface 26, which typically will be a surface of revolution about an axis 28, that first progressively widens and then progressively narrows as the outlet 14 is approached from the inlet 22. Preferably the inner surface 26 of the chamber 24 is spherical.

A high energy ignition device 30 may extend into the chamber 24.

Desirably, the vessel 18 includes an inner wall 32 having the inner surface 26 which defines the confines of the combustion chamber 24 and a spaced, outer shell or wall 34. In this regard, the ignitor 30 may serve as one of several radial support elements (those other than the ignitor 30 are not shown) which serve to locate the inner wall 32 with respect to the outer shell 34. Between the two is a duct 36. The duct 36 extends from an oxidant inlet 38 connected to a supply of oxidant 40 and about the chamber 24 to the inlet 22. Thus, oxidant used to sustain combustion within the chamber 24 serves to cool the wall 32 and the interior surface 26 as it flows from the oxidant inlet 38 to the inlet 22 to the combustion chamber 24. In a preferred embodiment, the oxidant entering the inlet 38 will already be in the gaseous phase for at low combustion rates, the relatively low flow rate of a liquid phase oxidant (or fuel if used for cooling) would allow the same to boil within the duct 36. This in turn makes the flow rate difficult to control and causes other problems as well. If desired, turbulators such as trip strips (not shown) may be disposed on either or both interior surfaces of the duct 36 to enhance cooling.

The inlet 22, as will appreciated from the foregoing discussion, serves as an oxidant inlet to the combustion chamber 24. In addition, a dual fuel injector, generally designated 42, extends into the chamber 24 through the inlet 22. The fuel injector 42 is disposed on the axis 28 and its radially outer periphery is located radially inwardly of the periphery of the inlet 22 so that an oxidant inlet port is effectively defined by the annular space between the fuel injector 42 and the interior wall 32 at the inlet 22. The fuel injector 42 is comprised of two concentric tubes or conduits 46 and 48. The tube 46 is the outermost tube and has a shorter length within the vessel 18 than the length of the tube 48 which, in turn, is located within the tube 46. In addition, swirler blades or vanes 50 are mounted as by brazing on the tube 46 so as to be located in the inlet 22 and impart a high degree of swirl to oxidant as it enters the chamber 24.

The outermost tube 46 terminates at a nozzle 51 adjacent the inlet 22 to the chamber 24. By any suitable means known in the art, the nozzle 51 is adapted to inject a cone-like spray 52 of fuel into the combustion chamber to combust with the oxidant. Much of the resulting hot gas will flow in a high velocity path 54 to the outlet 14. A central recirculation zone 56 exists inwardly of the path 54 to provide stabilized combustion within the chamber 24.

The tube 48 extends a majority of the way through the chamber 24 to terminate in a nozzle 60 somewhat upstream of the outlet 14. The nozzle 60 is in the progressively narrowing part of the chamber 24 and downstream of the recirculation zone 56. The nozzle 60 is centered on the axis 28 and injects a conical spray of fuel 64 generally toward the interior surface 26 of the vessel 18 near the outlet 14. Those skilled in the art will appreciate that gases flowing in the high velocity path 54 toward the outlet 14 are accelerating because of the converging shape of the combustion chamber at that point. Typically, the combuster is configured such that, in conjunction with the burning of fuel exiting the nozzle 51, the velocity of the gases in the path 54 where they intersect the spray cone 64 will be 200 feet per second or greater.

As can be seen in FIG. 2, the cone angle of the spray cone 64 is designated θ and typically will be on the order of 90 degrees. This also results in a conical spray 64 designated A. The angle A will typically be on the order of 90 degrees. The same may be larger as desired with exception that it should not be so great that any fuel from the spray 64 enters the recirculation zone 56. Should such occur, carbon buildup and the emission of black smoke is apt to result.

Generally speaking, to entertain a greater value of A, an increase in the angle θ is required and apart from limitations of nozzle fabrication technology and the desire to prevent spray 64 from entering the recirculation zone 56, the angle θ may be further increased above 90 degrees.

FIG. 2 also illustrates one configuration of the nozzle 60. The same includes a rather shallow, generally cup-shaped element 70 having an interior, generally cylindrical bore 72. Diametrically opposed fuel entry ports 74 enter tangentially through the cylindrical bore 72.

A cap 76 is fitted to the opening of the bore 72 and includes a frusto-conical recess 78. The major base of the frusto-conical recess 78 joins the bore 72 at a division line 80 while the minor base of the frusto-conical recess 78 adjoins an outlet opening 82 in the form of a very shallow cylinder.

As a consequence of this configuration, fuel under pressure entering the fuel entry ports 72 has a swirling motion imparted thereto within the interior of the nozzle 60. This swirling motion, as a result of centrifugal force, creates a radially outwardly acting force on the fuel. At the same time, because the fuel entry ports 72 are axially spaced from the outlet opening 82, the fuel is subject to a force acting in the axial direction as well and the result is the conical spray 64 shown in the drawings.

In one embodiment of the invention, fuel pressures as high as 256 psi are contemplated at maximum fuel flows which are about 256 lbs/hr. In prior devices, high turndown ratios have not been possible because of the inability of nozzles to sufficiently atomize fuel at lower pressures where a straight pressure atomizing nozzles have been utilized. However, by providing a high gas velocity and directing the fuel spray thereat at a substantial angle to the path of gas flow, sufficient atomization to prevent carbon buildup and/or the formation of black smoke can nonetheless be achieved using a nozzle such as the nozzle 60.

By way of example, FIG. 4 somewhat schematically illustrates the fuel film pattern at a fuel flow of about 45 lbs/hr. The bending effect of the high velocity gases on the "tulip" or fuel film causes the same to break so that relatively small fuel droplets are formed. However, these droplets are rapidly evaporated in the high velocity fuel flow.

FIG. 5 illustrates condition at about 35 lbs/hr while FIG. 6 illustrates conditions at about 25 lbs/hr, a value only slightly more than five percent of maximum fuel flow. Even at the resulting rather low fuel flows, quite unexpectedly it has been found that carbon build-up does not occur.

The just described structure has a number of advantages. For one, the dual fuel injector 42 is a unitary structure, preferably, although not necessarily including the swirler vanes 50. The injector 42 may be easily removed for servicing and just as easily reinstalled. Moreover, because the tube 48 is located centrally of a toroidal-shaped recirculation zone 56, it does not interfere with the outflow of hot gases through the outlet 14. At the same time, the relatively high fuel flow through the tube 48 assures that the same will not overheat. In fact, in some instances, it may be desirable to place a thermal barrier coating on the exterior of the tube 48 that will run at a relatively hot temperature to avoid any possibility of carbon buildup.

The spraying of the fuel in the cone 64 at a high angle into the high velocity gas path also provides advantages. In particular, the spray rapidly evaporates over a wide range of fuel pressures to achieve a rather high turn down ratio without carbon buildup. In the usual case, temperatures of several thousands of degrees F are obtained in the flame zone within the combuster 24 so it is possible to operate the combuster at an oxidant/fuel ratio that is somewhat more fuel rich than stoichiometric. If too rich, of course, carbon buildup can occur. However, an oxidant/fuel ratio of 0.86 of stoichiometric has proven satisfactory and serves to minimize oxidant use.

In the dilution zone whereat the fuel cone 64 is introduced, the amount of fuel introduced is such as to bring the gas temperatures down to the point whereat they will enter the turbine nozzle (not shown) at a temperature that is typically less than 2000 degrees F. Overall oxidant/fuel ratios between 2/1 and 3/1 where air is the oxidant are typical but it has been found that through use of the invention, even at such fuel rich conditions, excessive carbon buildup and/or heavy black smoke in the exhaust is avoided.

We claim:

1. A hot gas generator for providing hot gasses to a turbine wheel to drive the same comprising:
   a vessel with an interior wall and having a narrow inlet end, an opposite, narrow outlet end, and an intermediate relatively wide, combustion chamber interconnecting said inlet end and said outlet end and centered on a longitudinal axis;
   an oxidant inlet port at said inlet end; and
   a dual fuel injector disposed generally centrally within said oxidant port and extending a major way across said chamber generally on the longitudinal axis thereof, said fuel injection having a first fuel discharge port at said inlet end for directing a cone-like spray of fuel in a cone-like spray toward said combustion chamber and second fuel discharge port in said combustion chamber near and upstream of said outlet end for directing fuel toward said outlet and in a cone angle that is sufficiently wide that a large angle exists between the path of gases flowing to said outlet end and said fuel spray.

2. The hot gas generator of claim 1 wherein said injector comprises first and second, concentric conduits terminating in respective ones of said fuel discharge ports.

3. The hot gas generator of claim 1 wherein said cone angle is on the order of 90 degrees.

4. The hot gas generator of claim 1 wherein said second fuel discharge port comprises a housing having a circular opening on said axis, an interior frusto-conical chamber section having its minor base at said opening and an interior cylindrical chamber section extending oppositely of said opening from the major base of the frusto-conical chamber section, and at least one tangential fuel entry duct opening tangentially to said cylindrical chamber section.

5. The hot gas generator of claim 1 wherein there are two diametrically opposed ones of said entry ducts.

6. A hot gas generator for providing hot gasses to a turbine wheel to drive the same comprising:
- a vessel with an interior wall and having a narrow inlet end, an opposite, narrow outlet end, and an intermediate, relatively wide, combustion chamber interconnecting said inlet end and said outlet end;
- an oxidant inlet port at said inlet end; and
- means defining a first fuel injection port adjacent said inlet for injecting fuel for combustion within said intermediate relatively wide combustion chamber and for creating a central recirculation zone of combustion gases and an outer high velocity flow of combustion gases to said narrow outlet end; and
- a second fuel injection port within said chamber and upstream of said outlet end and downstream of said central recirculation zone for injecting fuel across said outer, high velocity flow of combustion gases at a substantial angle in the vicinity of said outlet end.

7. The hot gas generator of claim 6 wherein said first and second injection ports are associated with concentric tubes.

8. The hot gas generator of claim 6 wherein said vessel has a longitudinal axis on which said inlet and outlet ends and said ports are located, and said second port creates a cone-like spray of fuel on said axis.

9. The hot gas generator of claim 8 wherein said spray of fuel has a cone angle on the order of 90 degrees.

10. The hot gas generator of claim 1 wherein said large angle is such as to achieve sufficient atomization of fuel emanating from said second fuel discharge port so as to rapidly evaporate fuel over a wide range of fuel pressure to achieve a high turndown ratio without carbon buildup.

11. The hot gas generator of claim 6 wherein said substantial angle is sufficiently large as to achieve rapid evaporation of fuel injected through said second fuel injection port over a wide range of fuel pressures and sufficiently small such that fuel injected through said second fuel injection port will not enter said central recirculation zone.

* * * * *